June 6, 1933.  R. D. GLASS  1,912,577
FROZEN CONFECTION MAINTENANCE APPARATUS
Filed Oct. 24, 1932  3 Sheets-Sheet 1
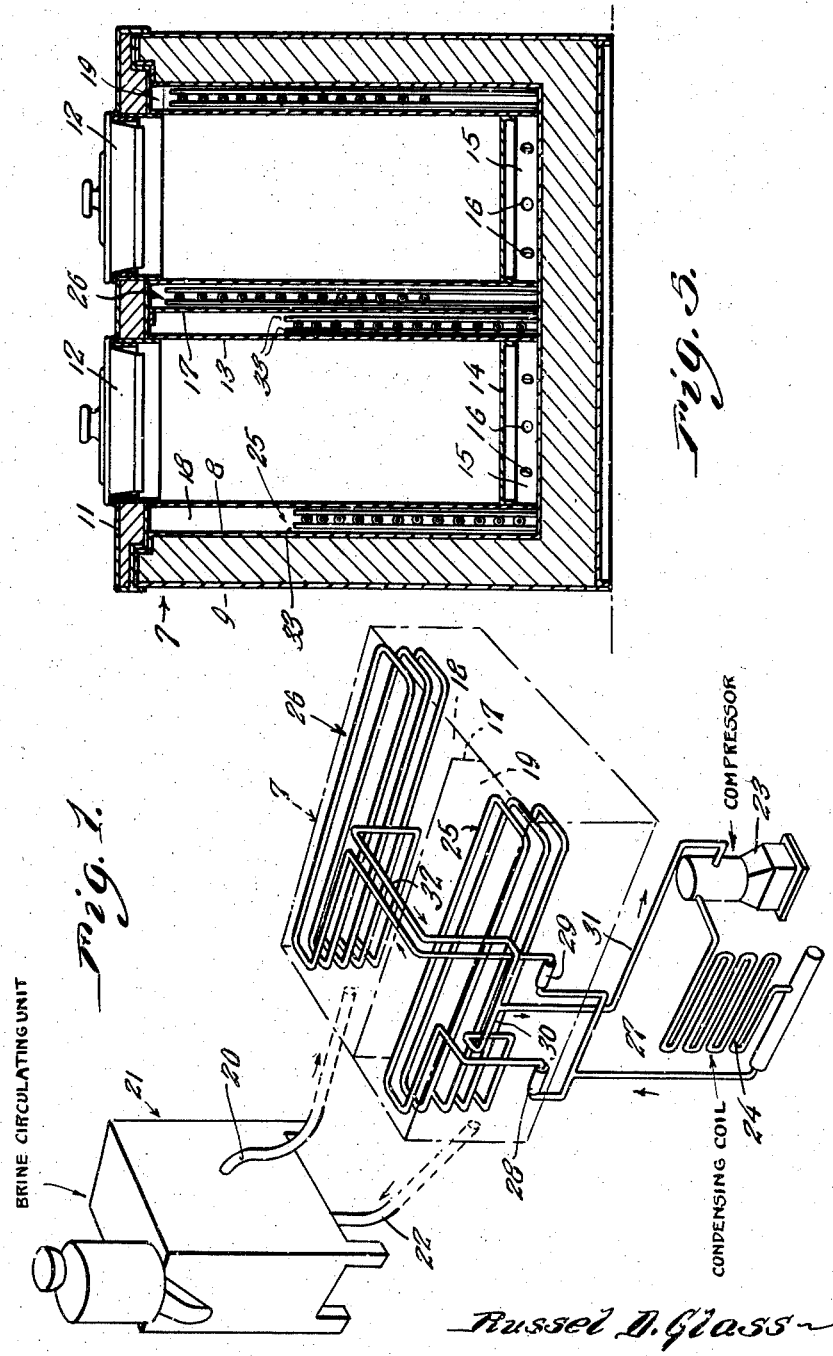
Inventor
Russel D. Glass
By Clarence A. O'Brien
Attorney

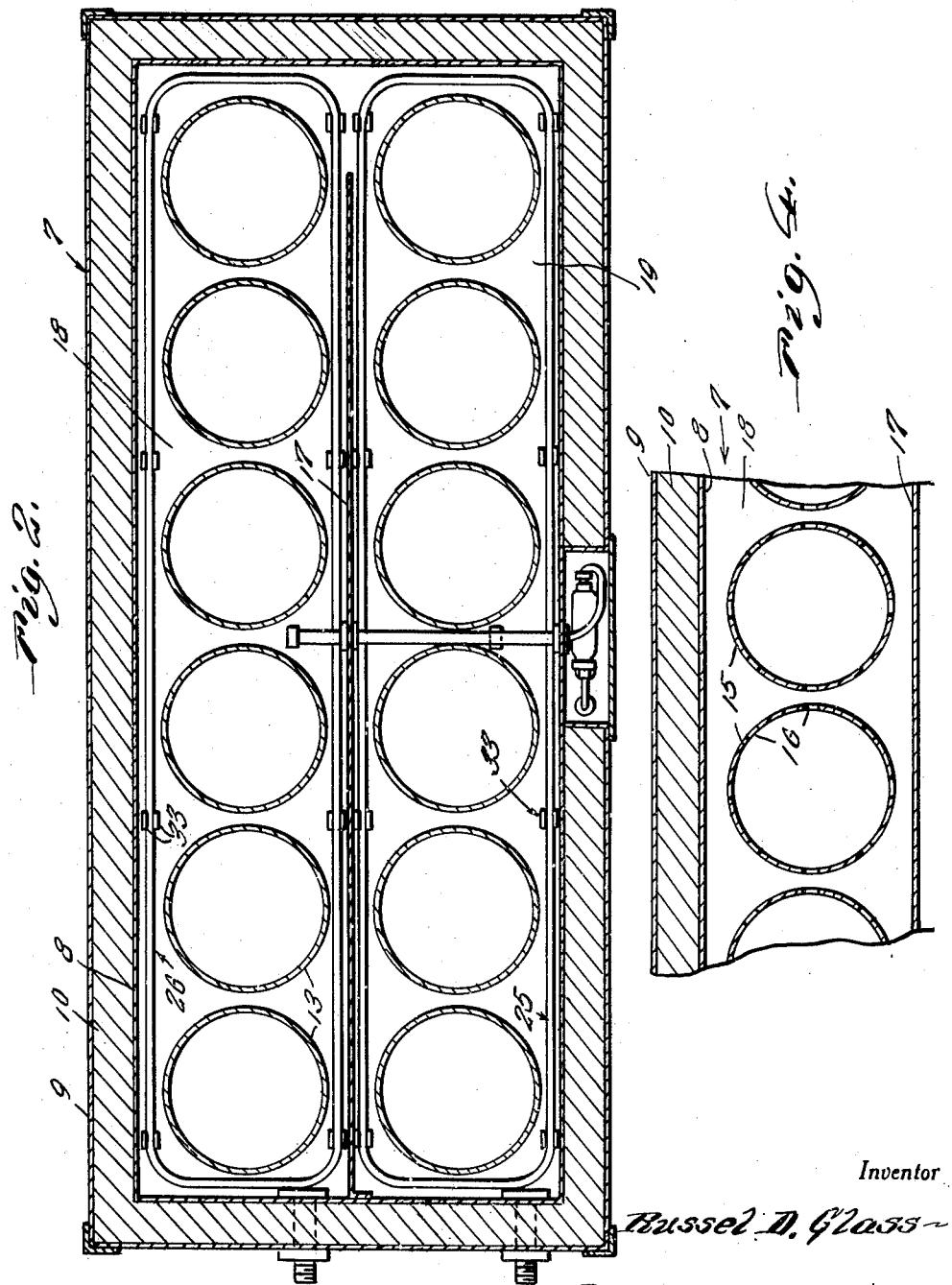

June 6, 1933.  R. D. GLASS  1,912,577
FROZEN CONFECTION MAINTENANCE APPARATUS
Filed Oct. 24, 1932  3 Sheets-Sheet 3
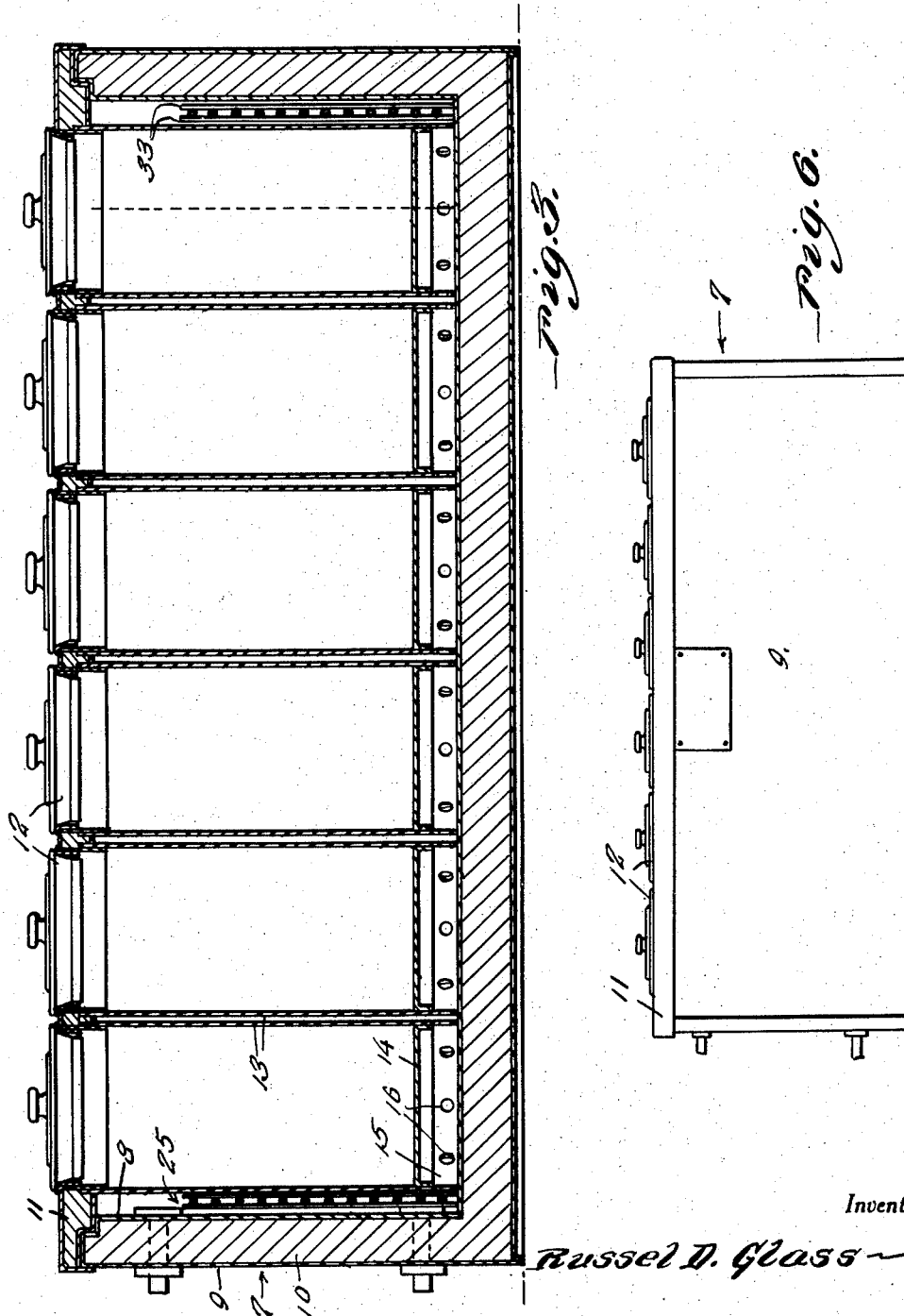
Inventor
Russel D. Glass
By Clarence A. O'Brien
Attorney Patented June 6, 1933

1,912,577

UNITED STATES PATENT OFFICE

RUSSEL D. GLASS, OF HARRISBURG, PENNSYLVANIA

FROZEN CONFECTION MAINTENANCE APPARATUS

Application filed October 24, 1932. Serial No. 639,365.

This invention relates to an improved machine or apparatus expressly designed for effectively accommodating and maintaining frozen confections in a readily eatable and saleable condition, the same being adapted for use in ice cream service parlors and similar establishments dispensing frozen delicacies.

The novelty is predicated upon an efficient and dependable system and suitable operating structure whereby the desired results may be accomplished in a simple, economical, and satisfactory manner.

Briefly stated, the preferred embodiment of the invention elected for carrying the inventive idea and conception into actual practice is characterized by a practical multiple can cabinet, an associated brine circulating unit for circulating the brine solution through the can compartments of the cabinet under desirable conditions, and an appropriate duplex refrigerating device having coils suitably arranged in the brine compartments of the cabinets.

The specific adoption and adaptation of structural features utilized for accomplishing this result will become more readily apparent from the following description and drawings.

In the drawings:

Figure 1 is a diagrammatic perspective view illustrating the preferred embodiment of the structure employed for properly maintaining the contents of the frozen confection cans in the cabinet.

Figure 2 is a horizontal sectional view through the can containing and conditioning cabinet.

Figure 3 is a central longitudinal sectional view through the same.

Figure 4 is a fragmentary detail horizontal sectional view.

Figure 5 is a transverse vertical section through the cabinet.

Figure 6 is an elevational view of the cabinet observing it from the exterior.

Referring now to the preferred embodiment of the invention as illustrated in the drawings, it will be observed that the cabinet is generally denoted by the numeral 7, the same having the external appearance of an elongated rectangular can storage cabinet of a conventional type.

As shown in Figures 2 to 5 inclusive, the cabinet embodies inner and outer metallic walls 8 and 9 of appropriate materials and an intervening filler 10 of suitable insulation material. The numeral 11 in Figure 5 designates a top and the numeral 12 indicates the covers or closures for the ice cream or confection containing cans 13. There are two rows of cans arranged in the relationship shown in Figure 2.

It will be noticed that the cans have elevated bottoms 14 defining depending skirts 15 provided with apertures 16 for circulation of the brine solution. As shown in Figure 2, the numeral 17 designates a longitudinal partitioning wall extending from the left hand end of the cabinet and terminating short of the right hand end to define a pair of distinguishable chambers or compartments 18 and 19 for the cans which arrangement permits equalized distribution and circulation of the brine liquid.

The brine is fed into the compartments 18 by way of a feed pipe 20 leading from a suitable pump-equipped circulating unit 21. In practice this unit is preferably constructed similar to an "Emery-Thompson ice cream freezer". This unit 21 serves to feed the solution under pressure through the compartment and it is returned to the unit by way of the completmental return pipe 22.

In addition to the circulation of brine, I provide the cabinet with a power operated refrigerating device or machine. As shown in Figure 1, this comprises a suitable compressor 23, a condensing coil 24, and a pair of spaced parallel cooling coils 25 and 26 respectively. Manifestly the refrigerant from the compressor is circulated through the condensing coil 24 and delivered by way of the main delivery pipe 27 to a valved intake pipe line 28 forming a part of the first coil 26. A similar valved delivery pipe 29 simultaneously supplies the refrigerant to the second coil 26. Incidently these coils are proportioned to fit into the compartments 18 and 19 in a manner to embrace the groups of cans 13 as illustrated in Figure 2.

After the refrigerant has spent its energy it is returned to the compressor from the coil 25 through the instrumentality of the return pipes 30 and 31 and likewise returned from the coil 26 by way of a similar return pipe 32.

In Figure 5, the numerals 33 merely designate stay members for supporting the convolutions of the coils. In connection with this figure 1 call attention to the fact that the coil 25 is submerged in the brine at the bottom, where it is cold, while the coil 26 is submerged in the upper half of the brine whereby to equalize and balance the cooling effect of the body of brine.

Otherwise stated, the elevated coil 26 is located in this raised position at the point where the brine enters, that is, in the compartment 18 while the companion coil 25 is submerged deeper in the solution in the compartment 19 from which the solution is discharged by the pump unit 21. This alternate position of the coils 25 and 26 provides the desired compensating means for securing uniform refrigeration of the brine as it is continuously circulated through the intercommunicating compartments 18 and 19.

The foregoing arrangement provides a practical and dependable structure whereby ice cream, frozen custard, and similar frozen confections may be placed in the cans 13 to harden to a requisite consistency for practical commercial purposes.

Particularly do I wish to emphasize the properly balanced construction of the insulated storage and maintenance cabinet for a multiplicity of ice cream cans when the cans are arranged in symmetrical rows and in spaced relation and contained in individual communicating compartments 18 and 19. Likewise, emphasis is placed on the arrangement whereby the compartments are defined through the agency of a partition 17 which affords the desired communication and circulation and insures continuous efficiency from the brine solution.

Of equal importance is the placement of the coils 25 and 26 in the can compartments in a manner to embrace the cans, whereby to secure the desired refrigerating results from the action of the circulated refrigerant through said coils. Consequently, each of the structural parts function to provide proportionate share in the development of a refrigerating system for ice cream and analogous products. The arrangement is rendered economical and efficient through the use of the unit 21, which may be in the form of a standardized marketed machine of a capacity to co-operate with the cabinet in securing complete results.

It is thought from the foregoing description that the advantages and novel features of the invention will be readily apparent.

It is understood that changes may be made in the construction and in the combination and arrangement of the several parts provided that such changes fall within the scope of the appended claim.

I claim:

A structure of the class described comprising an insulated cabinet, a central longitudinally extending partition having one end contacting an internal end wall of the cabinet and its other end spaced from the opposite end wall, said partition dividing the cabinet into two compartments which communicate with each other at one end of the cabinet, a brine circulating unit, a feed pipe connecting the discharge of said unit with one compartment and at that end of the cabinet which is contacted by the partition, a return pipe connecting the corresponding end of the other compartment with the inlet of the unit, a row of containers in each compartment, coils in each compartment surrounding the containers, the coils in the compartment with which the feed pipe is connected being elevated from the bottom of the compartment, while the coils in the compartment with which the return pipe is connected being located in the lower part of the compartment and a refrigerating machine connected with the coils.

In testimony whereof I affix my signature.

RUSSEL D. GLASS.